(12) United States Patent
Allione et al.

(10) Patent No.: US 9,002,491 B2
(45) Date of Patent: Apr. 7, 2015

(54) METHOD AND APPARATUS FOR GENERATING A SURFACE OF AN OPTICAL LENS

(75) Inventors: Pascal Allione, Charenton le Pont (FR); Fabien Muradore, Charenton le Pont (FR); Jordan Brouns, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 614 days.

(21) Appl. No.: 13/381,702

(22) PCT Filed: Jun. 29, 2010

(86) PCT No.: PCT/EP2010/059235
§ 371 (c)(1),
(2), (4) Date: Dec. 30, 2011

(87) PCT Pub. No.: WO2011/000846
PCT Pub. Date: Jan. 6, 2011

(65) Prior Publication Data
US 2012/0101618 A1 Apr. 26, 2012

(30) Foreign Application Priority Data
Jun. 30, 2009 (EP) .................................... 09305634

(51) Int. Cl.
G05B 19/42 (2006.01)
G06F 19/00 (2011.01)
(Continued)

(52) U.S. Cl.
CPC ...................................... G02C 7/061 (2013.01)

(58) Field of Classification Search
USPC ................... 700/89, 95, 97, 103; 351/159.06, 351/159.42
See application file for complete search history.

(56) References Cited

U.S. PATENT DOCUMENTS 4,676,610 A 6/1987 Barkan et al.
4,787,733 A * 11/1988 Silva ........................ 351/159.06
(Continued)

FOREIGN PATENT DOCUMENTS

EP 0 295 849 12/1988
EP 1 004 918 5/2000
(Continued)

*Primary Examiner* — Darrin Dunn
(74) *Attorney, Agent, or Firm* — Cozen O'Connor

(57) ABSTRACT

A method of generating a target surface $\tilde{S}(\overline{\lambda})$ of an optical lens for the manufacture of the optical lens according to optical lens parameters $\overline{\lambda}$, the method comprising: providing a set of L first surface difference data $E(\lambda_j)$ each first surface difference data $E(\lambda_j)$ corresponding to the surface difference between a pre-calculated surface $S_{\lambda_j}^{pc}(\alpha_{\lambda_j})$ (j=1, ..., L) and an initial surface $S_{\lambda_j}^{ini}$ (j=1, ..., L), from which the target surface will be generated, according to the expression:

$$E(\lambda_j)=S_{\lambda_j}^{pc}(\alpha_{\lambda_j})-S_{\lambda_j}^{ini} \; (j=1,\ldots,L)$$

where $\lambda_j$ (j=1, ..., L) correspond to the optical lens parameters of the pre-calculated optical lenses; providing a set of second surface difference data $\tilde{E}(\overline{\lambda})$ corresponding to the surface difference between the target optical surface $\tilde{S}(\overline{\lambda})$ and the initial surface $S_{\overline{\lambda}}^{ini}$ by linear interpolation of the first surface difference data $E(\lambda_j)$ according to the expression:

$$\tilde{E}(\overline{\lambda}) = \sum_{j=1}^{L} w_j^{\overline{\lambda}} E(\lambda_j),$$

where $w_j^{\overline{\lambda}}$ represents an interpolation coefficient; and; determining the target surface $\tilde{S}(\overline{\lambda})$ by combining the second surface difference data $\tilde{E}(\overline{\lambda})$ and the initial surface $S_{\overline{\lambda}}^{ini}$ according to the expression: $\tilde{S}(\overline{\lambda})=\tilde{E}(\overline{\lambda})+S_{\overline{\lambda}}^{ini}$.

8 Claims, 11 Drawing Sheets

(51) Int. Cl.
*G02C 7/00* (2006.01)
*G02C 7/06* (2006.01)

(56) References Cited

U.S. PATENT DOCUMENTS

| | | | |
|---|---|---|---|
| 6,220,704 B1* | 4/2001 | Mukaiyama et al. | 351/159.42 |
| 7,033,023 B2* | 4/2006 | Steele et al. | 351/159.42 |
| 7,125,118 B2* | 10/2006 | Kaga | 351/159.42 |
| 7,159,982 B2* | 1/2007 | Shinohara et al. | 351/159.74 |
| 7,175,277 B2* | 2/2007 | Shinohara et al. | 351/159.06 |
| 7,604,350 B2* | 10/2009 | Dursteler Lopez et al. | 351/159.75 |
| 7,930,151 B2* | 4/2011 | Haser et al. | 703/2 |
| 8,205,345 B2* | 6/2012 | Tesseraud | 33/200 |
| 2005/0012895 A1* | 1/2005 | Steele et al. | 351/169 |
| 2005/0146682 A1* | 7/2005 | Kaga | 351/169 |
| 2005/0157254 A1* | 7/2005 | Shinohara et al. | 351/158 |
| 2007/0132945 A1* | 6/2007 | Haser et al. | 351/159 |
| 2007/0225950 A1* | 9/2007 | Dursteler Lopez et al. | 703/2 |
| 2008/0284978 A1* | 11/2008 | Kaga | 351/169 |
| 2009/0244480 A1* | 10/2009 | De Gaudemaris et al. | 351/169 |
| 2010/0149492 A1* | 6/2010 | Allione et al. | 351/246 |
| 2011/0107884 A1* | 5/2011 | Miura et al. | 83/13 |
| 2012/0002161 A1* | 1/2012 | Altheimer et al. | 351/177 |
| 2014/0049747 A1* | 2/2014 | Altheimer et al. | 351/159.76 |

FOREIGN PATENT DOCUMENTS

| | | |
|---|---|---|
| WO | WO 00/52517 | 9/2000 |
| WO | WO 01/92948 | 12/2001 |
| WO | WO 2007/017766 | 2/2007 |

* cited by examiner

METHOD AND APPARATUS FOR GENERATING A SURFACE OF AN OPTICAL LENS

RELATED APPLICATIONS

This is a U.S. National Phase Application under 35 USC 371 of International Application PCT/EP2010/059235 filed on Jun. 29, 2010.

This application claims the priority of European application no. 09/305634.9 filed Jun. 30, 2009, the entire content of which is hereby incorporated by reference.

FIELD OF THE INVENTION

The present invention relates to a method of and an apparatus for generating a surface of an optical lens for the manufacture of the optical lens. The invention further relates to a method of and an apparatus for manufacturing an optical lens according to the surface generated by the method of the invention.

BACKGROUND OF THE INVENTION

Ophthalmic lens for the compensation of eyesight defects are well known. Multifocal ophthalmic lenses are a type of ophthalmic lens which in practice often comprise an aspherical face, and a face, which is spherical or toric, machined to match the lens to the wearer's prescription.

Progressive ophthalmic lenses usually comprise a far vision region, a near vision region, and a progressive corridor (or channel) there between. The progressive corridor provides a gradual power progression from the far vision zone to the near vision zone without a dividing line or a prismatic jump.

For multimodal lenses, the power in the various far, intermediate and near vision regions is determined by the prescription. A prescription may for example define lens characteristics such as a power value for near vision, a power value for far vision, an addition, and possibly an astigmatism value with its axis and prism.

Generally, the dispensing of a particular progressive addition lens to a wearer involves selecting a progressive addition lens design from a range of available progressive addition lens designs based on certain visual requirements of the wearer.

In a common method for producing progressive multifocal lenses according to optical lens parameters including prescription data, a semi-finished lens blank having suitable optical characteristics is selected based on a prescription. Typically the semi-finished progressive lens blank comprises a front progressive multifocal surface and a back spherical surface. The back surface of the semi-finished lens blank is then machined and polished to match the far-vision prescription.

An alternative method for producing multifocal progressive lenses uses less expensive single vision semi-finished lens blanks having a front spherical surface and a back spherical surface. Based on the optical lens parameters including prescription parameters and other wearer parameters, a single vision semi-finished lens blank having a suitable optical power is selected. A progressive surface design is then computed, for example obtained by optimisation, in accordance with optical lens parameters, and the back surface of the lens blank is machined and polished to produce the desired progressive surface. Although less expensive, this method for producing multifocal progressive lenses is relatively time consuming, partly due to the computational complexity of computing the progressive surface for each prescription.

The optimisation of an ophthalmic lens involves determining coefficients a of a surface equation $S(\alpha)$ for defining a surface layer of one of the surfaces of the lens according to optical lens parameters denoted as $\lambda$. A lens surface may be composed of one or more surface layers and thus defined by one or more surface equations. Optical lens parameters include wearing parameters $\lambda$ including optical prescription data such as prescribed values defining surface characteristics including sphere, cylinder, axe, prism power, addition, progression length etc; personalisation parameters, environmental factors, positioning parameters etc; for the wearing of the optical lens. The surface equation coefficients a are determined such that a function $F_\lambda(\alpha)$ known as a merit function and which represents the optical defects of an optical lens, is kept to a minimum.

In some cases in addition to coefficient $\alpha$ a set of equality constraints $CE_\lambda(\alpha)=0$ and inequality constraints $CI_\lambda(\alpha) \leq 0$ should be respected. These constraints may include prescription constraints relating to the near vision NV and the far vision FV zone or to lens thickness constraints, and the like.

The optimisation of an optical lens may thus be mathematically represented by the following problem:

$$\begin{cases} \min_\alpha F_\lambda(\alpha) \\ CE_\lambda(\alpha) = 0 \\ CI_\lambda(\alpha) \leq 0 \end{cases} \quad (1)$$

In many cases the function $F_\lambda(\alpha)$ is not continuous in variables $\lambda$. For example the base curves chart which is an allocation law of the curvature radius of one of the surfaces of the lens can introduce discontinuities to the function $F_\lambda(\alpha)$ The set O of all optical lens parameters $\lambda$ can be divided into M distinct and connected zones $O_i$ (i=1 ... M) of optical lens parameters in which the functions $F_\lambda(\alpha)$, $CE_\lambda(\alpha)$ and $CI_\lambda(\alpha)$ are continuous. The continuous functions associated with these zones are denoted as $F_\lambda^i(\alpha)_{(i=1, \ldots, M)}$, $CE_\lambda^i(\alpha)_{(i=1, \ldots, M)}$ and $CI_\lambda^i(\alpha)_{(i=1, \ldots, M)}$.

This leads to the following representations:

$$F_\lambda(\alpha) = \begin{cases} F_\lambda^1(\alpha) \text{ if } \lambda \in O_1 \\ \ldots \\ F_\lambda^M(\alpha) \text{ if } \lambda \in O_M \end{cases} \quad (2)$$

$$CE_\lambda(\alpha) = \begin{cases} CE_\lambda^1(\alpha) \text{ if } \lambda \in O_1 \\ \ldots \\ CE_\lambda^M(\alpha) \text{ if } \lambda \in O_M \end{cases} \quad (3)$$

$$CI_\lambda(\alpha) = \begin{cases} CI_\lambda^1(\alpha) \text{ if } \lambda \in O_1 \\ \ldots \\ CI_\lambda^M(\alpha) \text{ if } \lambda \in O_M \end{cases} \quad (4)$$

If we make the assumption that the optimisation problem represented by formula (1) has a unique solution, then the solutions of the problem are continuous in each zone $O_{i(i=1, \ldots, M)}$.

When an order for a personalised optical lens defined by a set of optical lens parameters $\lambda$ arrives in a prescription laboratory problem 1 is solved for each prescription using an adapted algorithm. Such a process is however time consuming and complex.

SUMMARY OF THE INVENTION

One object of the invention is to reduce the complexity of the calculation design and to improve the reliability of the calculations in the design of a surface of an optical lens.

According to a first aspect of the invention, there is provided a method of generating a target surface $\tilde{S}(\overline{\lambda})$ of an optical lens according to optical lens parameters $\overline{\lambda}$, the method comprising: providing a set of L first surface difference data $E(\lambda_j)$ each first surface difference data $E(\lambda_j)$ corresponding to the surface difference between a pre-calculated surface $S_{\lambda_j}^{pc}(\alpha_{\lambda_j})$ (j=1, . . . , L) and an initial surface $S_{\lambda_j}^{ini}$ (j=1, . . . , L), from which the target surface will be generated, according to the expression:

$$E(\lambda_j) = S_{\lambda_j}^{pc}(\alpha_{\lambda_j}) - S_{\lambda_j}^{ini} \ (j=1,\ldots,L)$$

where $\lambda_j$ (j=1, . . . , L) correspond to the optical lens parameters of optical lenses associated with the pre-calculated surfaces; providing a set of second surface difference data $\tilde{E}(\overline{\lambda})$ corresponding to the surface difference between the target optical surface $\tilde{S}(\overline{\lambda})$ and the initial surface $S_{\overline{\lambda}}^{ini}$ by linear interpolation of the first surface difference data $E(\lambda_j)$ according to the expression:

$$\tilde{E}(\overline{\lambda}) = \sum_{j=1}^{L} w_j^{\overline{\lambda}} E(\lambda_j),$$

where $w_j^{\overline{\lambda}}$ represents an interpolation coefficient; and; determining the target surface $\tilde{S}(\overline{\lambda})$ by combining the second surface difference data $\tilde{E}(\overline{\lambda})$ and the initial surface $S_{\overline{\lambda}}^{ini}$ according to the expression:

$$\tilde{S}(\overline{\lambda}) = \tilde{E}(\overline{\lambda}) + S_{\overline{\lambda}}^{ini}$$

The method according to a first aspect of the invention enables the time for calculation of a customised surface of an optical lens according to a prescription to be reduced. Moreover the method allows the complete geometry of any customised lens associated with a given prescription to be provided without having to perform a full optimisation process for that particular prescription. From a predetermined set of optimised lenses corresponding to a set of prescriptions, an interpolation of the predetermined optimised surface equations leads to the generation of a desired target surface, an approximated target surface, which otherwise would have been optimised according to the conventional methods. Thus the method according to the invention enables lens information to be provided rapidly to an optician.

According to a second aspect of the invention there is provided a method of manufacturing an optical lens surface comprising generating an optical surface $\tilde{S}(\overline{\lambda})$ according to the methods of the invention and a step of manufacturing the optical surface according to the optical surface $\tilde{S}(\overline{\lambda})$ generated.

Further optional features of embodiments of the invention are set out below:
the interpolation coefficient $w_j^{\overline{\lambda}} = 0$ if $\lambda_j \notin O_{\overline{\lambda}}$ where $O_{\overline{\lambda}}$ corresponds to a parameter subset for which $\overline{\lambda} \in O_{\overline{\lambda}}$ among M parameter subsets $O_{i(i=1,\ldots,M)}$
the interpolation coefficients $w_j^{\lambda_i} = \delta_{ij}$ for (i,j=1, . . . , L), where $\delta_{ij}$ represents the Kronecker symbol where $\delta_{ij} = 0$ if i $\neq$ j and $\delta_{ij} = 1$ si if i =j.
the optical lens parameters $\lambda_j$ (j=1, . . . , L) are modified in order to optimise the step of interpolation.
the method further includes the step of covering the predefined parameter subsets $O_{i(i=1,\ldots,M)}$ by a one or more of $N_T$ n-polytopes $P_k$ (k=1, $N_T$) the vertices of which make up part of the optical lens parameters $\lambda_j$ (j=1, . . . , L) according to the expression:

$$O = \bigcup_{i=1}^{M} O_i = \bigcup_{k=1}^{N_T} P_k.$$

According to another aspect, the invention relates to a computer program product comprising one or more stored sequence of instructions accessible to a processor which, when executed by the processor, causes the processor to carry out the steps of a method according to the invention. The invention also relates to a computer readable medium carrying one or more sequences of instructions of the computer program product according to the invention.

Unless specifically stated otherwise, it will be appreciated that throughout the specification terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the context of the present invention, the following terms may be deemed to have meanings indicated herein below:
Near vision point NV relates to the point of a surface of a progressive addition lens through which the sight of the wearer passes when said wearer is in a reading position.
Far vision point FV relates to the point of a surface of a progressive addition lens through which the sight of the wearer passes when said wearer looks at infinity
near Vision Zone: zone of the lens that surrounds the near vision point, and within which the local optical characteristics of optical power and of astigmatism of the lens are substantially identical to those of the near vision point;

far Vision Zone: zone of the lens that surrounds the far vision point, and within which the local optical characteristics of optical power and of astigmatism of the lens are substantially identical to those at the far vision point;

addition of a Progressive Addition Lens: difference between the value of optical power of the lens at the near vision point and that at the far vision point;

optical Characteristics of a Progressive Addition Lens: data on optical power, astigmatism, aberration, etc., relating to the modifications of a light beam that passes through the progressive addition lens;

prescription: set of optical characteristics of optical power, of astigmatism and, where relevant, of addition, determined by an ophthalmologist in order to correct the vision defects of an individual, for example by means of a lens positioned in front of his eye.

surface Characteristics of a Progressive Addition Lens: geometrical data relating to one face of the lens, such as values of average sphere, cylinder, axe at surface points, for example;

prism Reference Point (PRP)—point on the front surface of a lens at which the prismatic effect of the lens is determined;

mounting Centre (MC) or Fitting Cross (FC)—point on the front surface of a lens used by the manufacturer as a reference point for positioning the lens in front of the eye.

BRIEF DESCRIPTION OF THE DRAWINGS

Embodiments of the invention will now be described, by way of example only, and with reference to the following drawings in which.

DETAILED DESCRIPTION OF THE DRAWINGS

Figure 1:
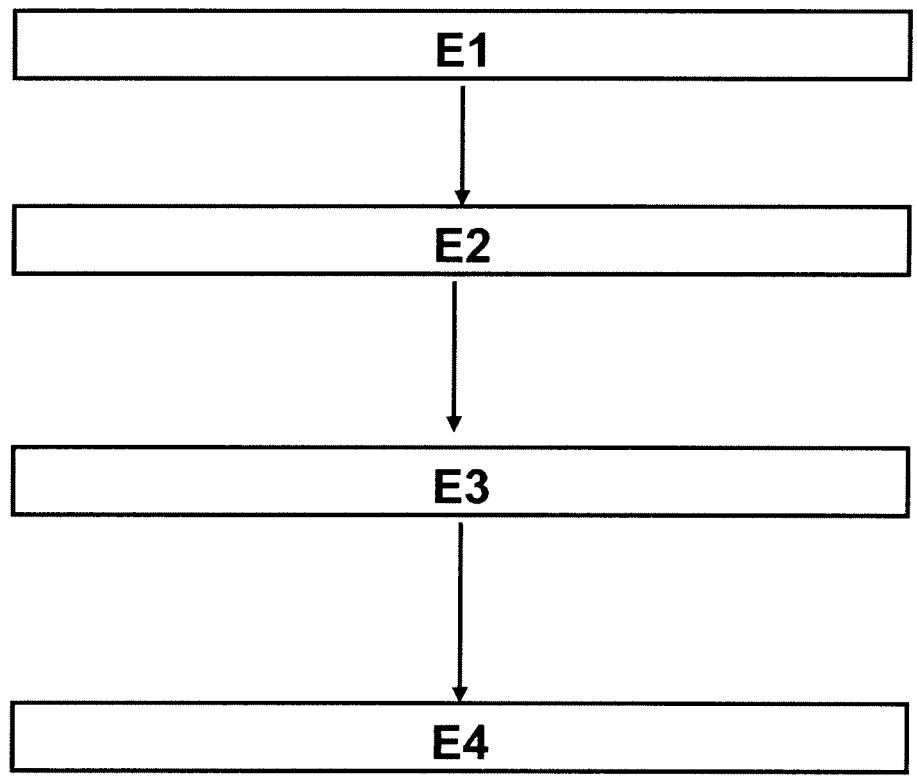
FIG. 1 is a flow chart of steps of a method of generating a surface of an optical lens according to embodiments of the invention.

A first embodiment of the method according to the invention will now be described with reference to FIGS. 1 to 4.

In an initial step E1 of the method, a predetermined number L of surfaces $S_{\lambda_j}^{pc}(\alpha_{\lambda_j})(j=1, \ldots, L)$ according to a set of L optical lens parameter data $\lambda_j$ (j=1, ..., L) are pre-calculated. The surfaces may be calculated according to surface calculation methods known in the art, such as for example that described in European patent EP990939 which is incorporated herein by reference thereto. In step E2 a set of L first surface difference data $E(\lambda_j)$ is determined in which each surface difference data $E(\lambda_j)$ defines a surface layer corresponding to the difference between a pre-calculated optimised surface $S_{\lambda_j}^{pc}(\alpha_{\lambda_j})(j=1, \ldots, L)$ and a corresponding initial surface $S_{\lambda_j}^{ini}$ (j=1, ..., L) according to the expression:

$$E(\lambda_j) = S_{\lambda_j}^{pc}(\alpha_{\lambda_j}) - S_{\lambda_j}^{ini} (j=1, \ldots, L) \quad (5)$$

The initial surface $S_{\lambda_j}^{ini}$ (j=1, ..., L) acts as a starting point for the optimisation process for generating a target surface.

The first difference data $E(\lambda_j)$ or optimised difference data is stored in a database from which it can be accessed for subsequent steps of the method.

In step E3, when a prescription for an optical lens according to an optical lens parameter data $\bar{\lambda}$ is received, second surface difference data $\tilde{E}(\bar{\lambda})$ or approximated difference data for defining the difference between the target optical surface $\tilde{S}(\bar{\lambda})$ and the corresponding initial surface $S_{\bar{\lambda}}^{ini}$ is then approximated by linear interpolation of the pre-determined first difference data $E(\lambda_j)$ according to the expression:

$$\tilde{E}(\bar{\lambda}) = \sum_{j=1}^{L} w_j^{\bar{\lambda}} E(\lambda_j) \quad (6)$$

where $w_j^{\bar{\lambda}}$ represents an interpolation coefficient.

The interpolation coefficient $w_j^{\bar{\lambda}}=0$ if $\lambda_j \notin O_{\bar{\lambda}}$ where $O_{\bar{\lambda}}$ corresponds to a parameter subset or zone to which $\bar{\lambda}$ belongs i.e. $\bar{\lambda} \in O_{\bar{\lambda}}$, from among M zones $O_{i(i=1, \ldots, M)}$.

The condition $w_j^{\bar{\lambda}}=0$ if $\lambda_j \notin O_{\bar{\lambda}}$ ensures that the interpolation will be performed on a continuous function. The interpolation coefficients $w_j^{\lambda_i}$ should respect the condition $w_j^{\lambda_i}=\delta_{ij}$ for (i,j=1, ..., L) where $\delta_{ij}$ represents the Kronecker symbol defined by $\delta_{ij}=0$ if i≠j and $\delta_{ij}=1$ if i=j. This means that if the optical lens parameters $\bar{\lambda}$ of the received prescription for the target surface correspond to one of those stocked in the data base, the interpolation should remain coherent with the optimisation calculation.

In step E4 the final approximate customised or target surface $\tilde{S}(\bar{\lambda})$ according to the prescription is determined by combining the second difference data $\tilde{E}(\bar{\lambda})$ and the initial surface $S_{\bar{\lambda}}^{ini}$ according to the expression:

$$\tilde{S}(\bar{\lambda}) = \tilde{E}(\bar{\lambda}) + S_{\bar{\lambda}}^{ini} \quad (7)$$

The method according to the embodiment of the invention includes two main operations. A first sampling operation consists in defining for each sub-set $O_{i(i=1, \ldots, M)}$ in which the solution to equation (1) is continuous in variable $\lambda$, the sample points $\lambda_j$ for which problem (1) will be solved. A further operation of the method according to embodiments of the invention involves defining a rule for constructing weighting coefficients $w_j^{\bar{\lambda}}$ for the step of interpolation.

A preliminary step of the method according to certain embodiments of the invention may include changing the parameters $\bar{\lambda}$ in order to work in conditions better adapted to the step of interpolation. For example, instead of working with prescription variables sphere, cylinder and axe, it may be more suitable in some cases to work with optical power in 3 particular optical directions, horizontal, vertical and diagonal.

In the sampling operation the idea is to mesh the sub-sets $O_i$ sufficiently finely in order to obtain a more reliable approximation for obtaining the target surface.

Assuming subset zones $O_i$ are covered by a set of $N_T$ n-polytopes $P_k$ (k=1, ... $N_T$) according to the expression $$O = \bigcup_{k=1}^{N_T} P_k.$$

The vertices of the n-polytopes form part of the optical lens parameters $\lambda_j$ (j=1, ..., L). The assumption is made that the covering is such that the intersection between two different polytopes is either empty or is one of the (n-d)-cells, where d≥1, of one of the 2 polytopes where n corresponds to the number of optical lens parameters and the space dimension, and where (n-d) is thus less than n.

Example of suitable polytopes include:

n-simplexes (triangles, tetrahedrons, ...)

parallelotopes (squares, parallelepiped, ...)

For example, the set of optical lens parameters can be partitioned into triangles according to (sph, cyl)$_i$ values and into intervals along the dimensions consecrated to the axe and the addition.

In terms of interpolation given the optical lens parameters $\bar{\lambda}$ included in the sub-set $O_i$, and by the decomposition of $O_i$, there is at least one polytope $P_k$ respecting the conditions that $\bar{\lambda} \in P_k$. If $\lambda_k^l$ (l=1, ..., N) represent the vertices of the polytope $P_k$, from the definition of a polytope, there is a series of real numbers $w_k^l$ (l=1, ..., $N_s$) such that $$w_k^l \geq 0, \sum_{l=1}^{N_s} w_k^l = 1$$

and such that $$\bar{\lambda} = \sum_{l=1}^{N_s} w_k^l \lambda_k^l.$$

Coefficients $w_k^l$ (l=1, ..., $N_s$) will be used for the interpolation of the first difference data $E(\lambda_k^l)$ to provide second difference data $\tilde{E}(\bar{\lambda})$ for determining the target surface. If the polytopes are of an n-simplex type, the coefficients $w_k^l$ (l=1, ..., $N_s$) correspond to the barycentric coordinates of the point $\bar{\lambda}$ with respect to the simplex $P_k$. Since any n-polytope can be decomposed into an association of n-simplexes the vertices of which being those of the n-polytope, the problem can be reduced to finding the barycentric coordinates of an n-simplex. The decomposition of an n-polytope into an association of n-simplexes respects the condition that the intersection between two distinct simplexes is either empty or is one of the (n−d) simplex cells (d≥1) of one of the 2 simplexes.

The principle of the method according to the embodiment of the invention will now be illustrated for the case of a lens A (of type Physio). In the example of lens A the optical lens parameters $\lambda$ are characterised by Far Vision FV prescription parameters of sphere, cylinder and axe values, and addition values.

Thus the optical lens parameters $\lambda$ lie in a sub-space of 4 dimensions. If further parameters such as personalisation parameters are added, the parameter space will have additional dimensions. In this case the sub-sets $O_{i(i=1, \ldots, M)}$ come directly from the base design of the product. In this example, there are 6 bases (1.75 2.75 3.75 5.25 6.50 8.00) Thus the number of parameter zones M=6 and the sub sets $O_i$ of parameters are decomposed according to the following Cartesian product: $O_i$=(sph,cyl)$_i$×[0,180[×[0.75,4].

The set of parameters (sph,cyl)$_i$ represents the subset of prescription data (sph,cyl) associated with the $i^{ème}$ base. The interval [0,180[ corresponds to the axe intervals and the interval [0.75,4] corresponds to the addition intervals. In the base designs for lens A each of the sub-sets (sph,cyl)$_i$ is connected; i.e. they are not partitioned into disjointed parts and are polygons in the plane.

In this embodiment the partitioning of subsets $O_i$ into polytopes is carried out in two steps. In one step the subsets are partitioned by triangles in (sph, cyl) and in another step the intervals associated with the axe and addition are partitioned into sub-intervals.

Figure 2A:
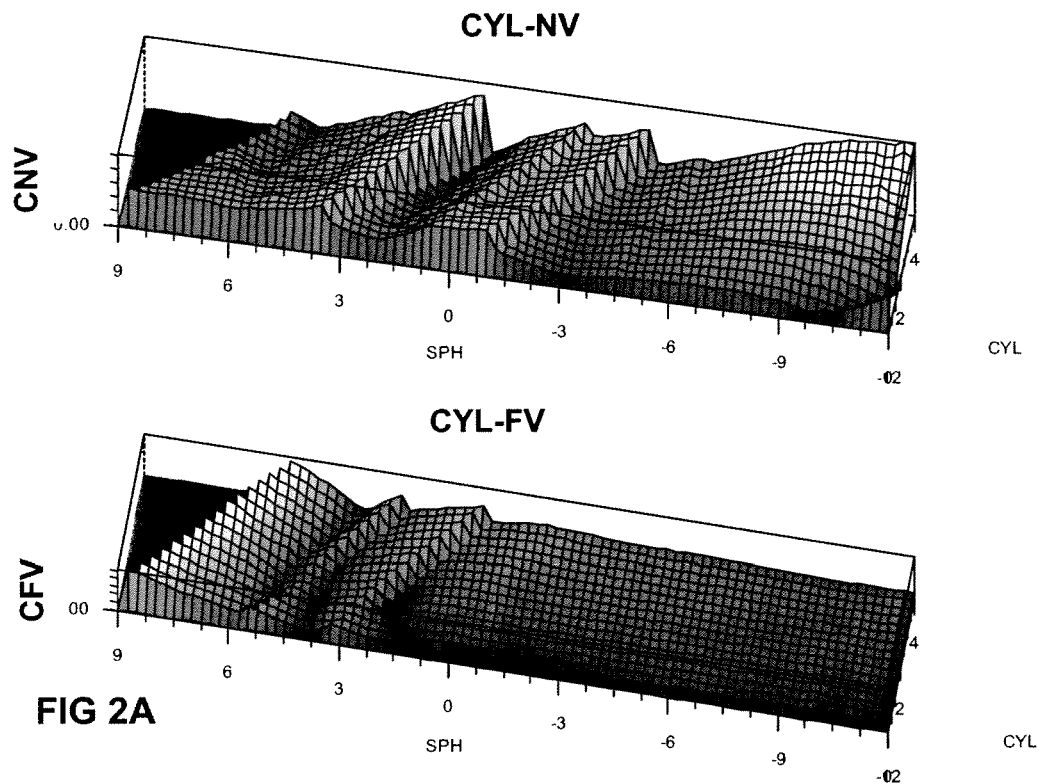
FIG. 2A is a 3D graphical representation of FV and NV cylinder values of first difference data $E(\lambda_j)$ for prescription parameters Axe=0, Add=2.0 according to an embodiment of the invention.
Figure 2B:
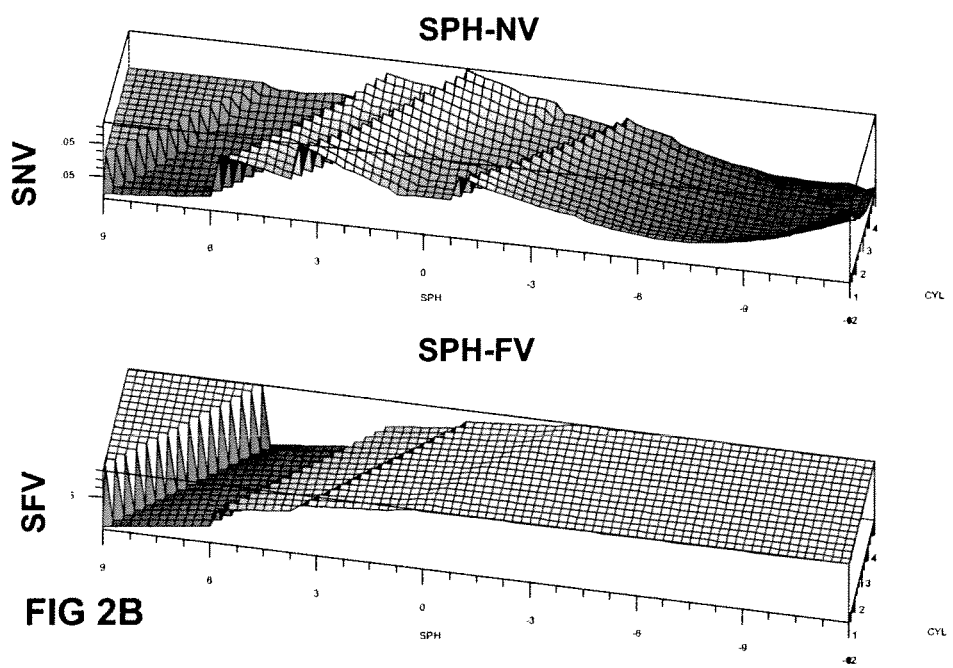
FIG. 2B is a 3D graphical representation of FV and NV mean sphere values of first difference data $E(\lambda_j)$ for prescription parameters Axe=0, Add=2.0 according to an embodiment of the invention.
Figure 3:
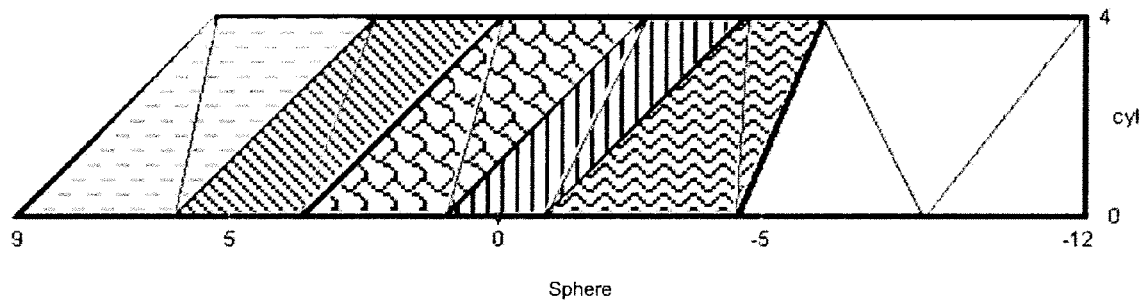
FIG. 3 is a graphical representation of partitioning of a plane of prescriptions into triangles.

In order to carry out a partitioning in (sph, cyl) the variations of the surface difference data E($\lambda$) according to the surface value and sphere value of the prescription parameters are analysed. The analysis can be carried out in the case where Axe=0 and Add=2.0 diopters. For each prescription the magnitudes of the average sphere and the cylinder values at the far vision FV and near vision NV points of the surface difference data are calculated, for example according to the method described in WO2007017766A2 which is incorporated herein by reference thereto. FIGS. 2A and 2B graphically illustrate the cylinder and sphere values for the set of prescriptions. FIG. 2A illustrates the cylinders in NV and FV of the first surface difference data $E(\lambda_j)=S_{\lambda_j}(\alpha_{\lambda_j})-S_{\lambda_j}^{ini}$ (j=1, ..., L) for the set of prescriptions in which Axe=0 and Add=2.0. FIG. 2B graphically illustrates the spheres in NV and FV of the first surface difference data $E(\lambda_j)=S_{\lambda_j}(\alpha_{\lambda_j})-S_{\lambda_j}^{ini}$ (j=1, ..., L) for the set of prescriptions in which Axe=0 and Add=2.0. The gap in values that can be seen on the graphical representations correspond to the different base changes; i.e. to the discontinuities of the optimisation solutions. Apart from these discontinuous zones the variation of sphere or cylinder quantities is relatively gradual and each zone can be easily approximated by a plane or preferably by several planes. A meshing based on several triangles is sufficient to ensure a good approximation between the optimised surfaces and the approximated surfaces. FIG. 3 is a graphical representation of a plane of prescription parameters of sphere value versus cylinder value and illustrates the manner in which the plane of prescription parameters is partitioned into triangles. Each section pattern represents a base partitioned into 2 or 3 triangles by lines.

Figure 4:
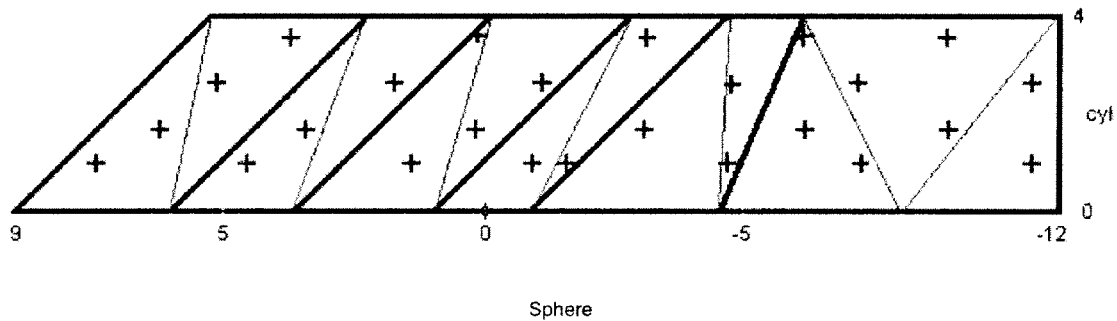
FIG. 4 is a graphical representation of a partitioned plane of validation prescriptions.

In order to validate the partitioning, the optimised surface and the approximated surface have been calculated for a representative set of prescriptions (in this case Axe=0, addition=2). The representative prescriptions for validating the partitioning are shown in FIG. 4.

Figures 5A, 5B:
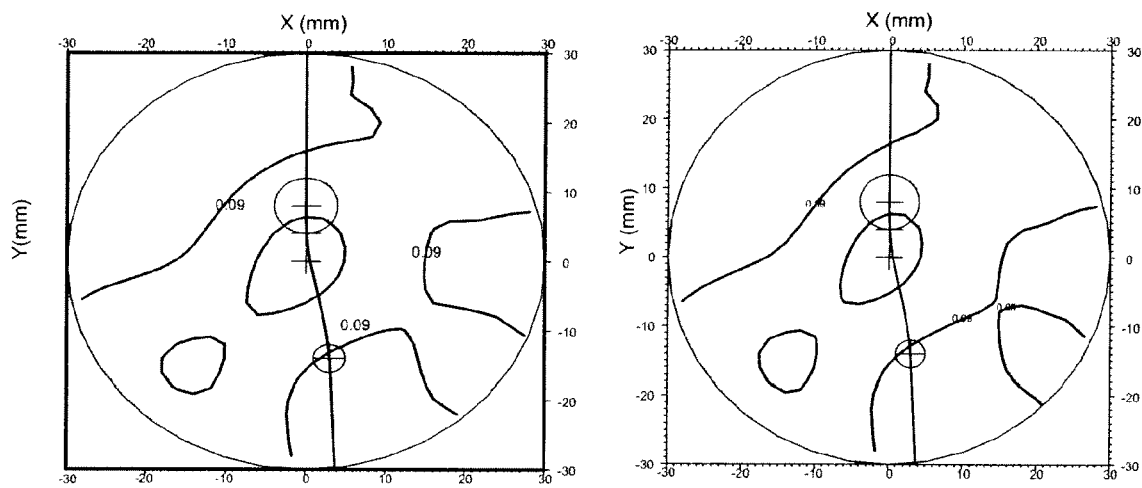
FIG. 5A is a surface map of the mean sphere values of approximated difference data for a first prescription.
FIG. 5B is a surface map of the mean sphere values of optimised difference data for the first prescription.
Figures 6A, 6B:
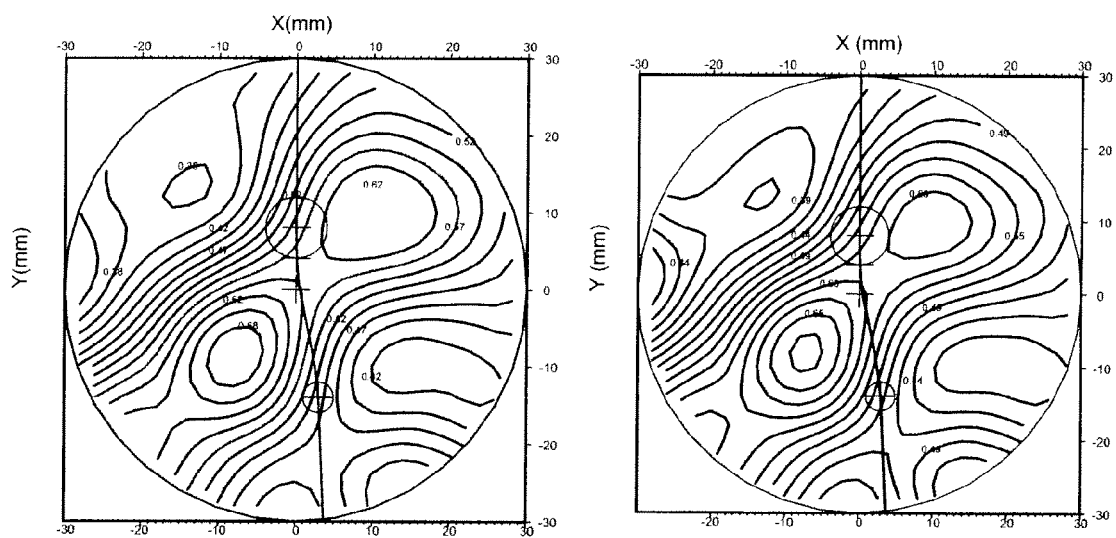
FIG. 6A is a surface map of the cylinder values of approximated difference data for the first prescription.
FIG. 6B is a surface map of the cylinder values of optimised difference data for the first prescription.

FIGS. 5 and 6 illustrate as an example the surface maps of the mean sphere and cylinder values of the optimised difference data and approximate difference data for the prescription (Sph=4.75, cyl=0.75, Axe=0, Add=2.0).

On the set of validation prescriptions the maximum differences in sphere and cylinder values between the optimised surface difference data and the approximated surface difference data observed at the control points (PRP, MC, FV, NV) was found to be 0.05 D. This may be deemed as being sufficient. In order that this may be reduced a finer partitioning may be used.

Figure 7:
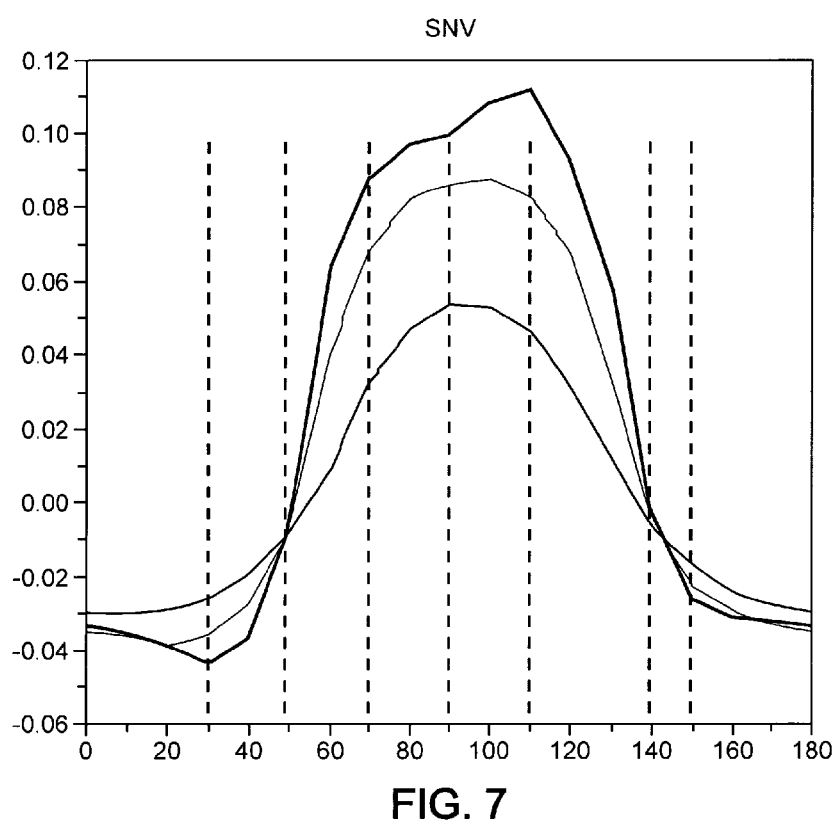
FIG. 7 is a graphical representation of the partitioning of the interval of axes into 8 sub-intervals.

For partitioning according to the prescription axe, the variation of the sphere and cylinder values at the control points PRP, MC, FV, NV of the optimised difference data for a number of test prescriptions in each base was studied. For each base a set of sub-intervals on which the differences in the variable "axe" could be approximated by a straight segment was identified. In this way, for the base 2.75 the interval 0-180 degrees was partitioned into 8 sub-intervals as shown in FIG. 7 which represents the variation of the NV sphere as a function of the axe for a number of prescriptions in this base.

For the set of 6 bases the interval 0-180 was divided in this way according to the following rules
Base 8.00: 0/30/50/70/100/130/150/180
Base 6.50: 0/20/50/70/90/110/120/140/180
Base 5.25: 0/30/50/70/90/110/130/140/180
Base 3.75: 0/30/50/70/90/120/140/150/180
Base 2.75: 0/30/50/70/90/110/140/150/180
Base 1.75: 0/30/50/70/90/120/140/180

With such partitioning the maximum differences obtained at the points of control are of the order of 0.12 D for the same set of test prescriptions as illustrated in FIG. 4 extended to a number of different axes. In order to reduce these differences a finer partitioning of the axes per base can be used.

Figure 8A:
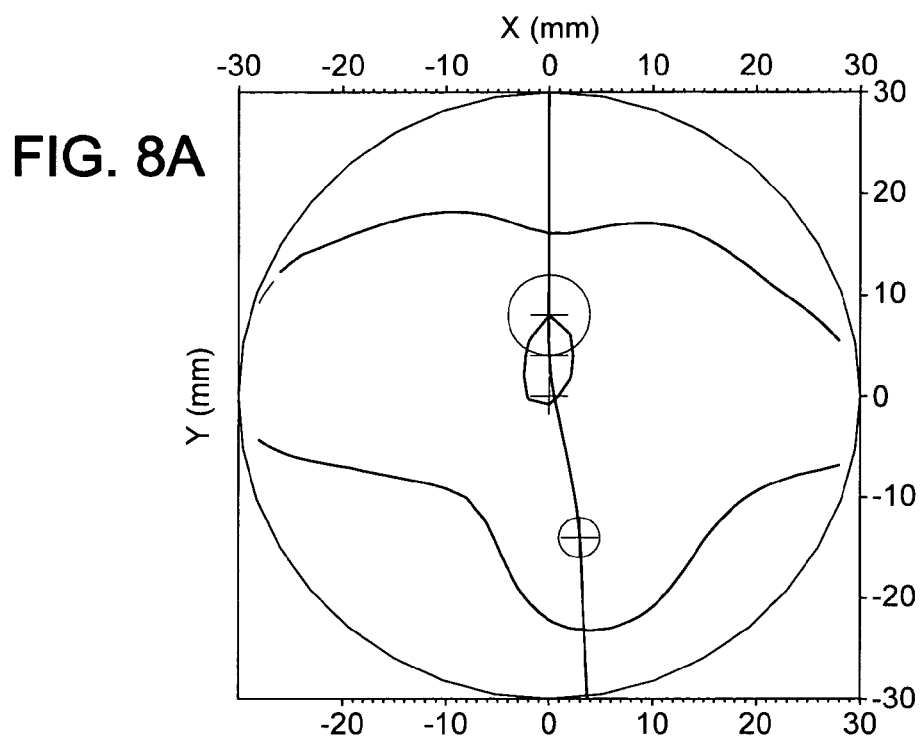
FIG. 8A is a surface map of the mean sphere values of approximated difference data for the second prescription.
Figure 8B:
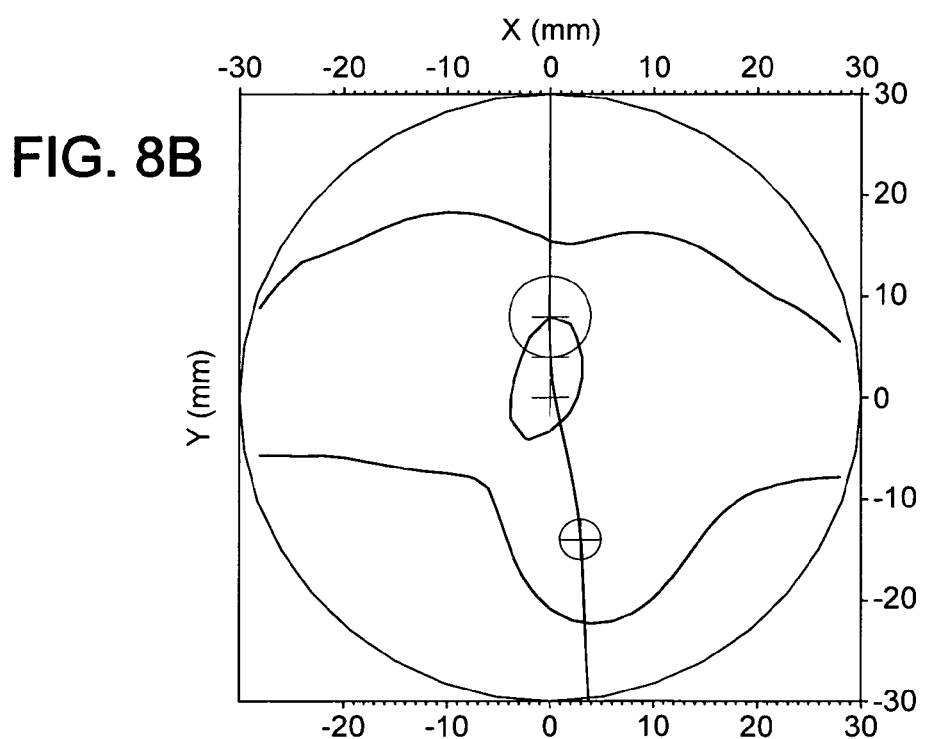
FIG. 8B is a surface map of the mean sphere values of optimised difference data for the second prescription.
Figure 9A:
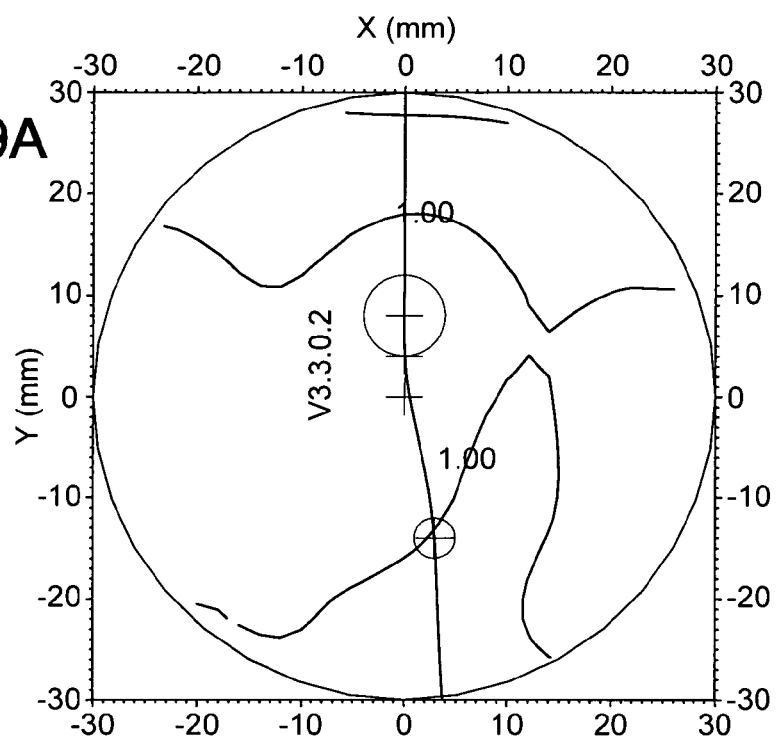
FIG. 9A is a surface map of the cylinder values of approximated difference data for the second prescription.
Figure 9B:
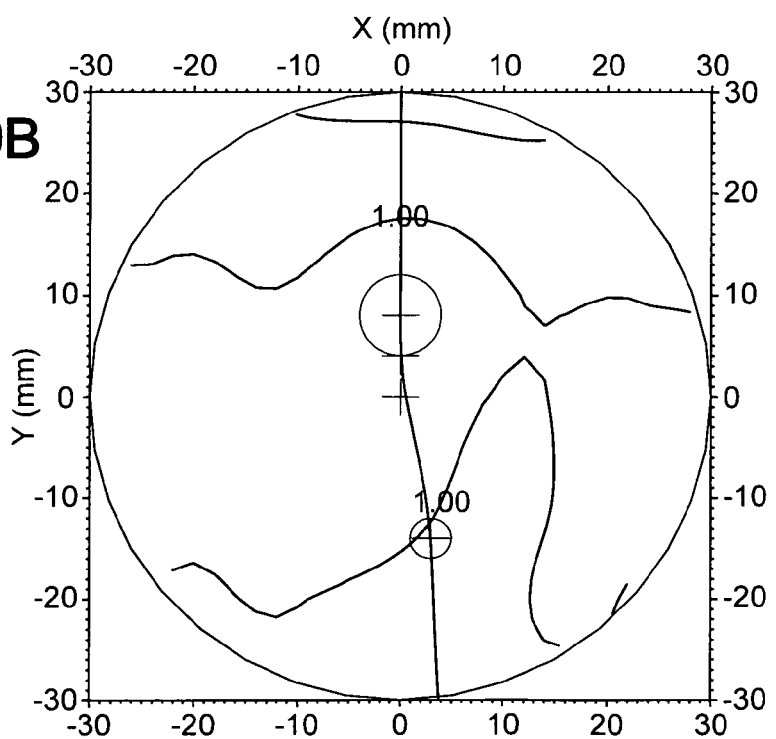
FIG. 9B is a surface map of the cylinder values of optimised difference data for the second prescription.

FIGS. 8 and 9 respectively show an example of surface maps of mean sphere and cylinder values for optimised and approximated difference data for the prescription (Sph=3.25, Cyl=1.50, Axe=80, Add=2.0) corresponding to the base 6.50.

Figure 10A:
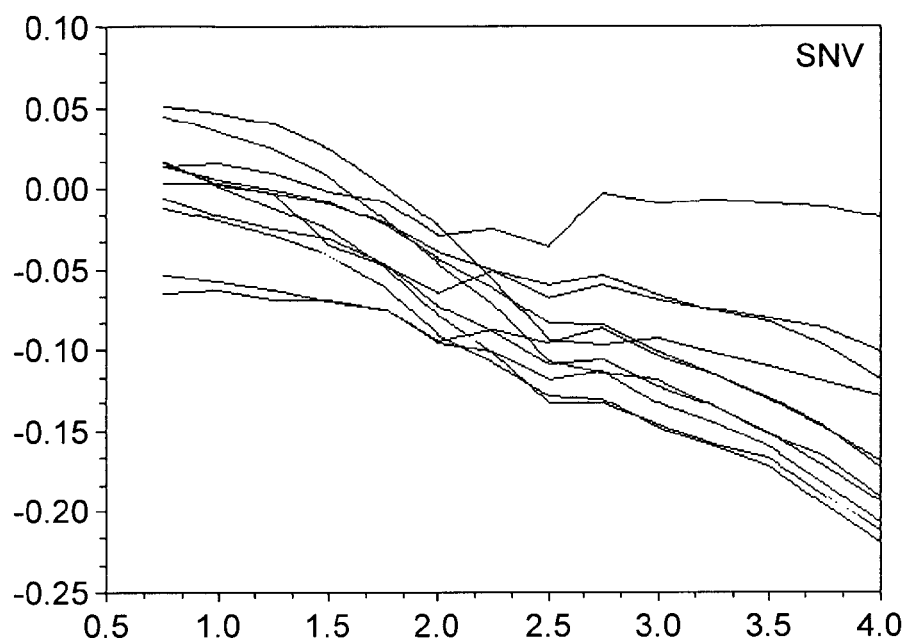
FIG. 10A is a graphical representation of the variation in NV sphere values as a function of addition for a number of prescriptions of base 8.0.
Figure 10B:
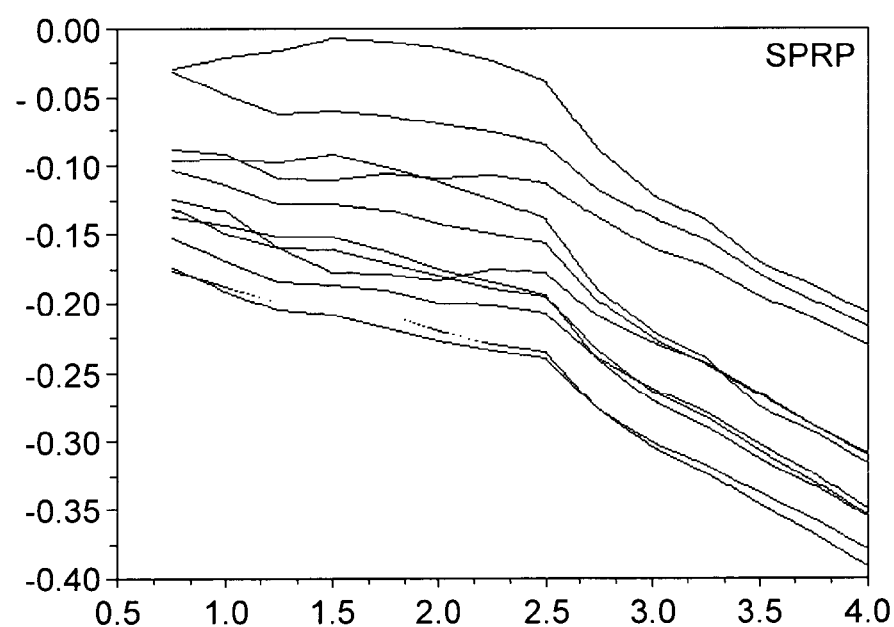
FIG. 10B is a graphical representation of the variation in PRP sphere values as a function of addition for a number of prescriptions of base 8.0.
Figure 10C:
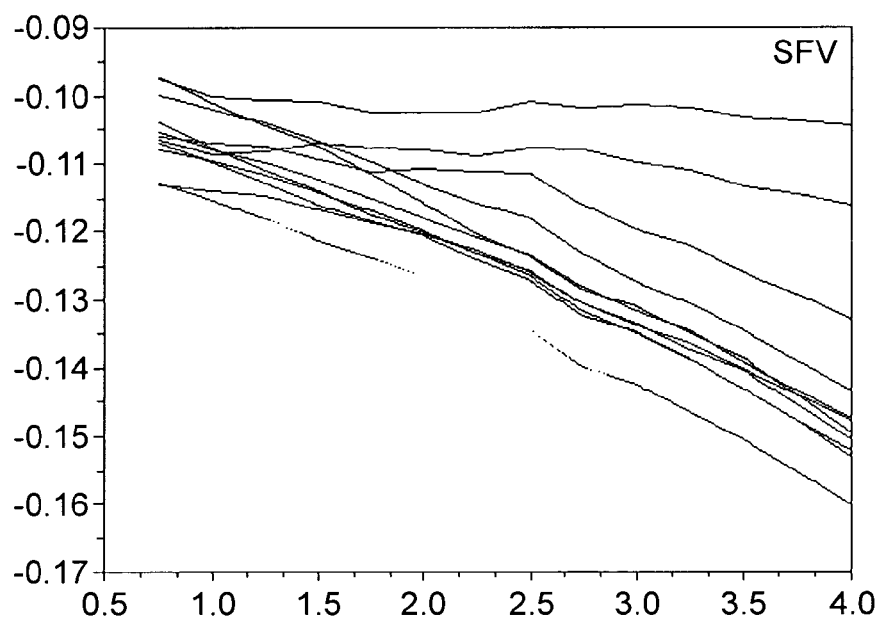
FIG. 10C is a graphical representation of the variation in FV sphere values as a function of addition for a number of prescriptions of base 8.0.

Partitioning according to addition values can be carried out in a similar manner to partitioning according to axe values. After analysis of the variation of the optimum difference data according to the addition, sub intervals of [0.75, 4.0] necessary for appropriately fitting the curves of sphere difference values and cylinder difference values at the control points as a function of the addition par straight segments are defined per base. Thus FIG. 10 presents for a certain number of prescriptions of base 8.0 sphere variations at NV, PRP and FV of the optimised difference data as a function of the addition (axe=0).

It can be seen from these figures that the dependence on addition of the spheres of the difference data is virtually linear locally contrary to that for the axe.

In studying the variations base by base the interval [0.75, 4.0] has been partitioned as follows:
Base 8.00: 0.75/2.00/2.50/2.75/4.00
Base 6.50: 0.75/1.50/2.00/2.50/4.00
Base 5.25: 0.75/1.50/2.00/2.50/3.00/4.00
Base 3.75: 0.75/1.50/2.00/2.25/2.75/3.25/4.00
Base 2.75: 0.75/1.50/2.00/3.75/4.00
Base 1.75: 0.75/1.25/1.50/2.00/3.25/4.00

Figure 11A:
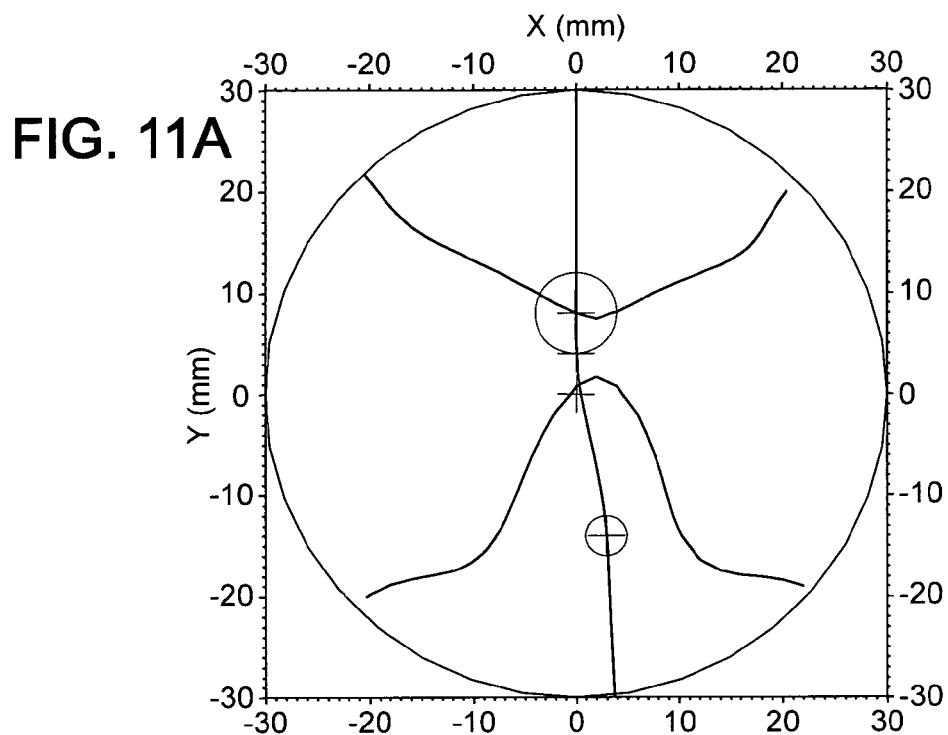
FIG. 11A is a surface map of the mean sphere values of approximated difference data for a third prescription.
Figure 11B:
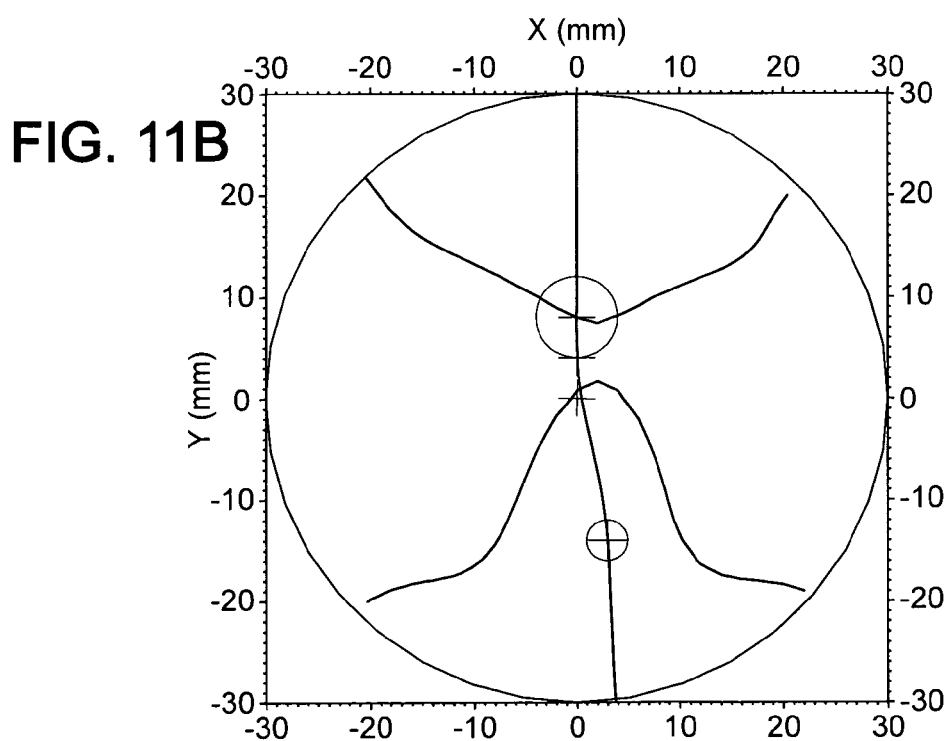
FIG. 11B is a surface map of the mean sphere values of optimised difference data for the third prescription.
Figure 12A:
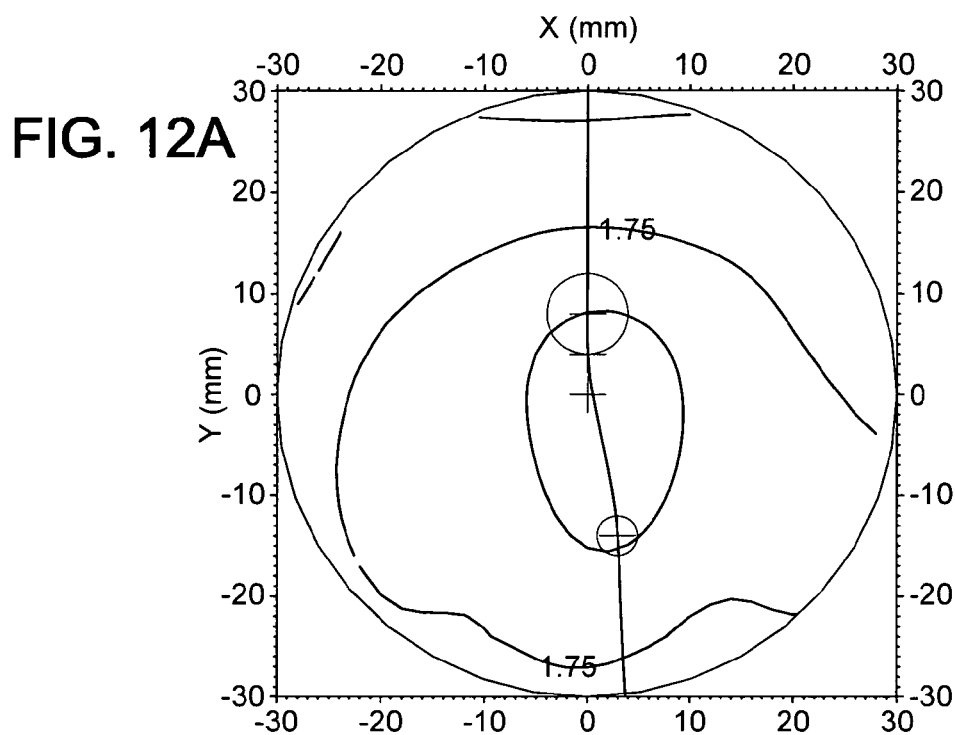
FIG. 12A is a surface map of the cylinder values of approximated difference data for the second prescription.
Figure 12B:
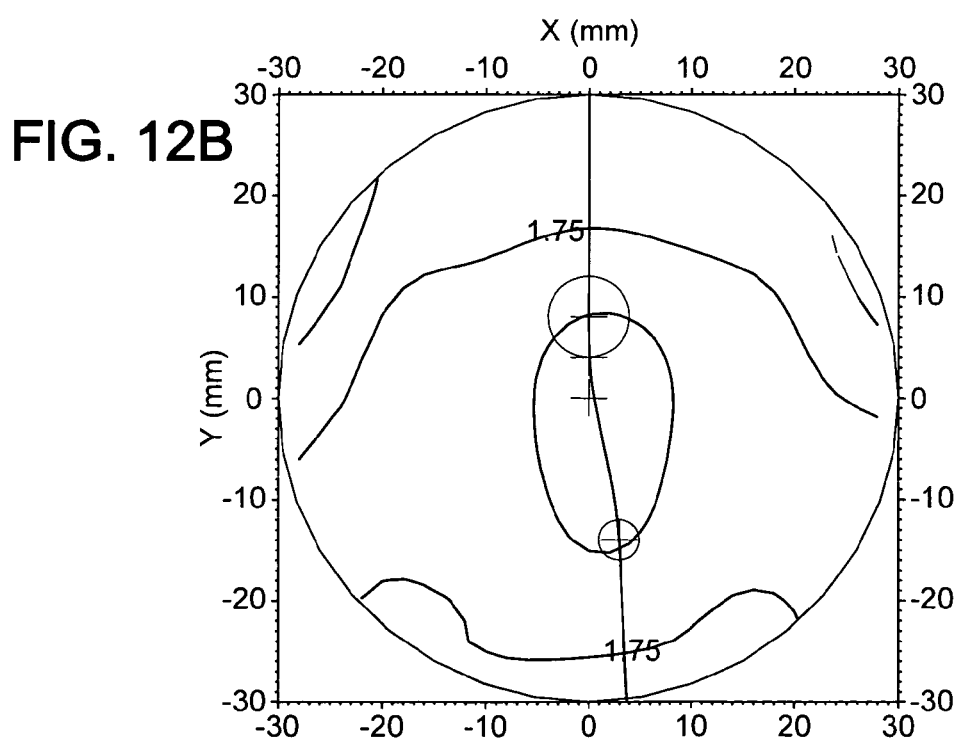
FIG. 12B is a surface map of the cylinder values of optimised difference data for the second prescription.

FIGS. 11 and 12 illustrate surface maps of sphere and cylinder values for optimised difference data and the difference data approximated for a given prescription and for an addition of 1.75 D.

The partitioning of the optical lens parameters space into polytopes can be performed manually or automatically. A database of predetermined optimised surfaces may be built up over time and prescription labs may share surface data which has already been optimised.

The methods according to embodiments of the invention thus enable the calculation time for calculating a target optical surface to be reduced. This in turn enables information such as lens thicknesses to be provided more quickly to an optician without the need for a full optimisation process to be implemented for each lens prescription.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:
1. A method of generating a target optical surface $\tilde{S}(\bar{\lambda})$ of an optical lens according to optical lens parameters $\bar{\lambda}$, for manufacturing the optical lens, the method comprising the steps of:
providing a set of L first surface difference data $E(\lambda_j)$ each first surface difference data $E(\lambda_j)$ corresponding to a surface difference between a pre-calculated surface $S_{\lambda_j}^{pc}$ $(\alpha_{\lambda_j})(j=1,\ldots,L)$ and an initial surface $S_{\lambda_j}^{ini}$ $(j=1,\ldots,L)$, from which a target surface of the optical lens is generated, according to:

$$E(\lambda_j)=S_{\lambda_j}^{pc}(\alpha_{\lambda_j})-S_{\lambda_j}^{ini}(j=1,\ldots,L)$$

where $\lambda_j$ $(j=1,\ldots,L)$ correspond to the optical lens parameters of optical lenses associated with the pre-calculated surfaces;
providing a set of second surface difference data $\tilde{E}(\bar{\lambda})$ corresponding to a surface difference between the target optical surface $\tilde{S}(\bar{\lambda})$ and the initial surface $S_{\bar{\lambda}}^{ini}$ by linear interpolation of the first surface difference data $E(\lambda_j)$ according:

$$\tilde{E}(\bar{\lambda}) = \sum_{j=1}^{L} w_j^{\bar{\lambda}} E(\lambda_j),$$

where $w_j^{\bar{\lambda}}$ represents an interpolation coefficient; and;
determining by a processor the target surface $\tilde{S}(\bar{\lambda})$ of the optical lens by combining the second surface difference data $\tilde{E}(\bar{\lambda})$ and the initial surface $S_{\bar{\lambda}}^{ini}$ according to:

$$\tilde{S}(\bar{\lambda})=\tilde{E}(\bar{\lambda})+S_{\bar{\lambda}}^{ini}.$$

2. The method according to claim 1, wherein the interpolation coefficient $w_j^{\bar{\lambda}}=0$ if $\lambda_j O_{\bar{\lambda}}$,
where $O_{\bar{\lambda}}$ corresponds to a parameter subset for which $\bar{\lambda} \in O_{\bar{\lambda}}$ from among M parameter subsets $O_{i(i=1,\ldots,M)}$.

3. The method according to claim 1, wherein the interpolation coefficients $w_j^{\lambda_i}=\delta_{ij}$ for $(i,j=1,\ldots,L)$ where $\delta_{ij}$ represents the Kronecker symbol where $\delta_{ij}=0$ if $i \neq j$ and $\delta_{ij}=1$ si $i=j$.

4. The method of claim 1, wherein the optical lens parameters $\lambda_j$ $(j=1,\ldots L)$ are modified in order to optimize the step of interpolation.

5. The method of claim 1, further comprising the step of covering the pre-defined parameter subsets $O_{i(i=1,\ldots,M)}$ by one or more of $N_T$ n-polytopes $P_k$ $(k=1,N_T)$, vertices of which make up part of the optical lens parameters $\lambda_j$ $(j=1,\ldots,L)$ according to:

$$O = \bigcup_{i=1}^{M} O_i = \bigcup_{k=1}^{N_T} P_k.$$

6. A method of manufacturing an optical lens comprising generating an optical surface $\tilde{s}(\bar{\lambda})$ of the optical lens according to the method of claim 1 and a step of manufacturing the optical surface according to the optical surface $\tilde{s}(\bar{\lambda})$ generated.

7. A computer program product comprising a non-transitory storage medium comprising a set of instructions which, when executed by a data-processing device, causes the device to perform the steps of the method of claim 1.

8. A non-transitory computer-readable medium having computer-executable instructions to enable a computer system to perform the method of claim 1.

* * * * *